United States Patent [19]
Kato, Jr.

[11] 3,736,376
[45] May 29, 1973

[54] AUTOMATIC CONTROL SYSTEM FOR VIDEO TRACKER

[75] Inventor: Paul S. Kato, Jr., Torrance, Calif.

[73] Assignee: Hughes Aircraft Company, Culver City, Calif.

[22] Filed: Mar. 30, 1967

[21] Appl. No.: 628,232

[52] U.S. Cl........178/6.8, 178/DIG. 21, 250/203 CT, 178/7.92, 178/7.5 SE
[51] Int. Cl..................................................H04n 3/00
[58] Field of Search..........................178/7.92, 7.2 E, 178/7.5, 6.8, 7.5 SE, DIG. 21; 250/203 CT

[56] References Cited

UNITED STATES PATENTS 3,341,653   9/1967   Kruse......................................178/6.8

Primary Examiner—Benjamin A. Borchelt
Assistant Examiner—S. C. Buczinski
Attorney—James K. Haskell and Walter J. Adam

[57] ABSTRACT

A control system for video trackers with monitor receivers on which tracking gate windows are displayed. Signals from a video tracker are shaped, gated and filtered, and then utilized to automatically maintain a substantially constant ratio between the window size and the portion of the window occupied by the image of the object being tracked. For a camera with zoom lens, the signals are used to operate a motor drive for the lens. For a camera with fixed focus lens, the signals are used for automatic gate size control in the video tracker.

14 Claims, 15 Drawing Figures

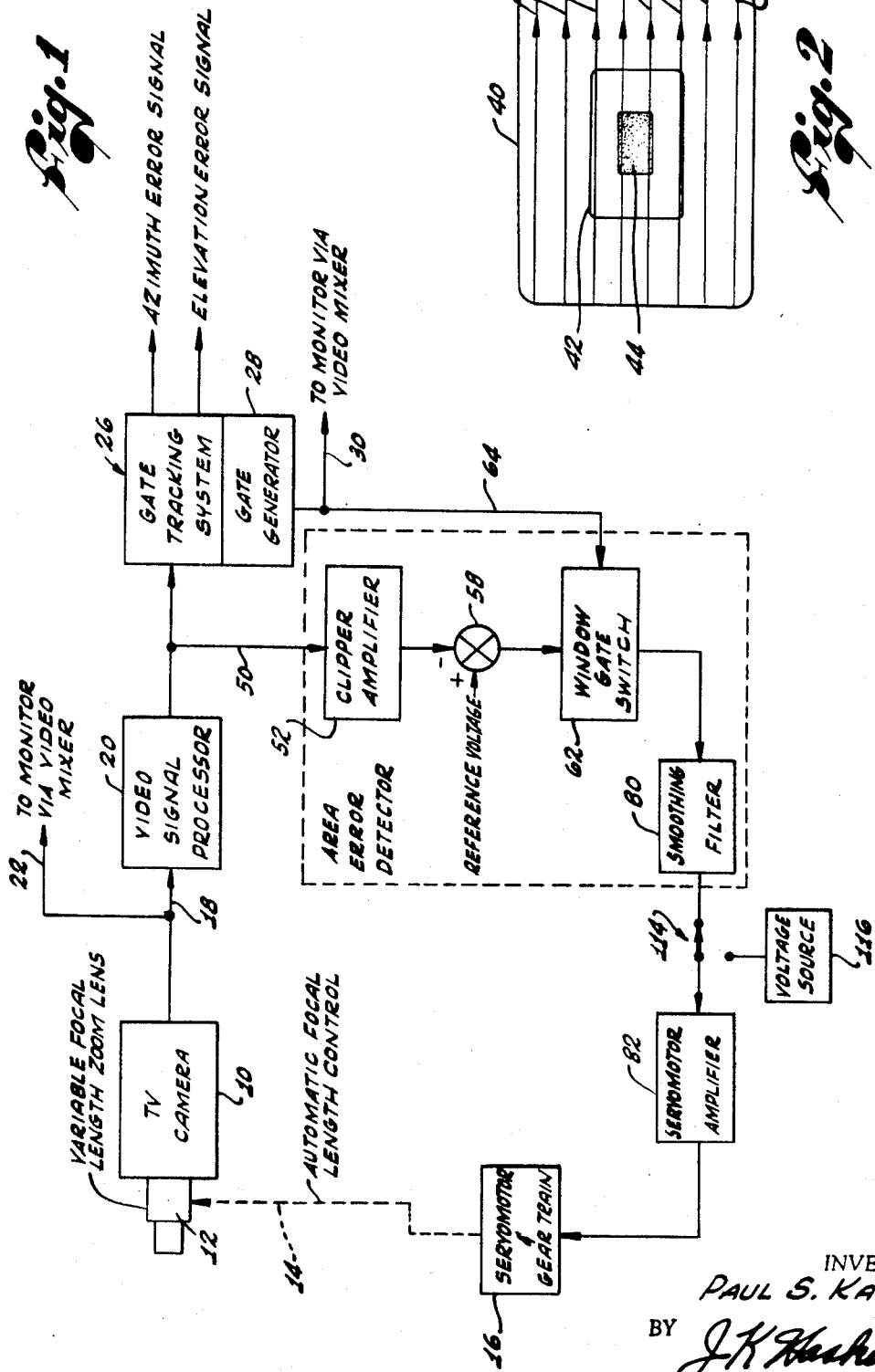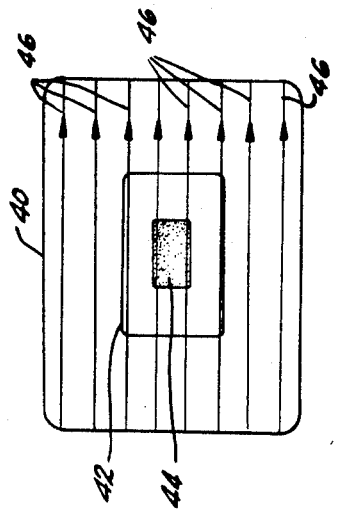

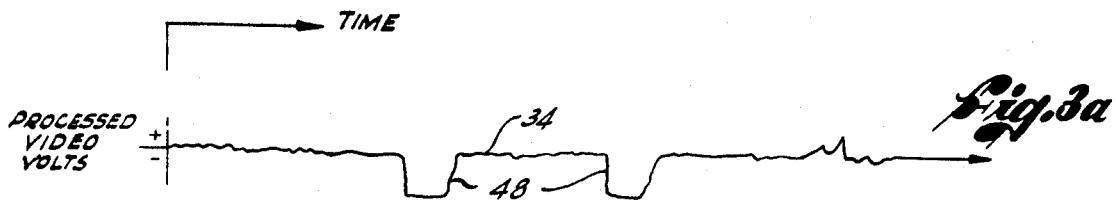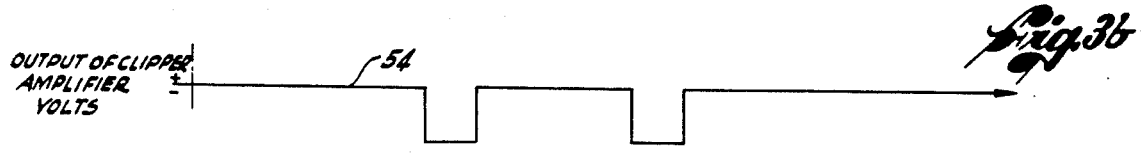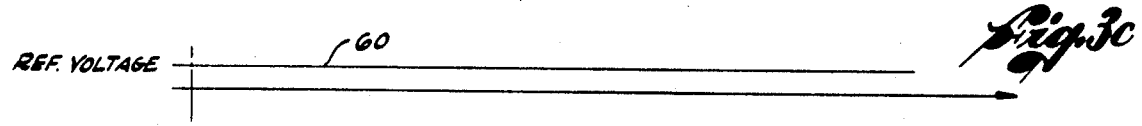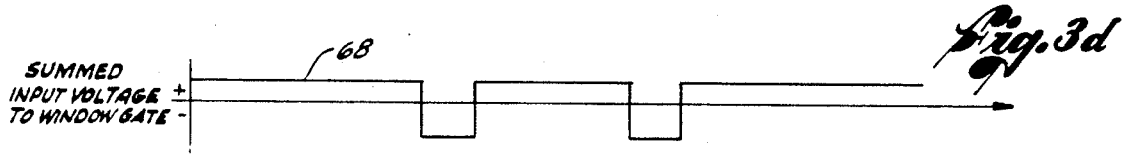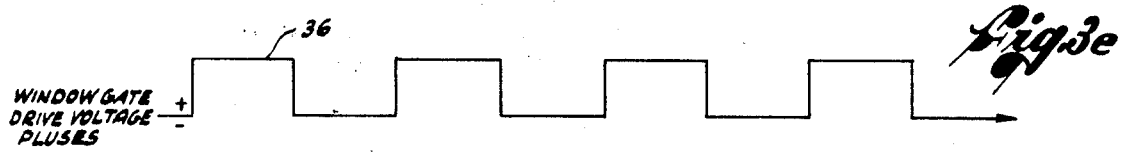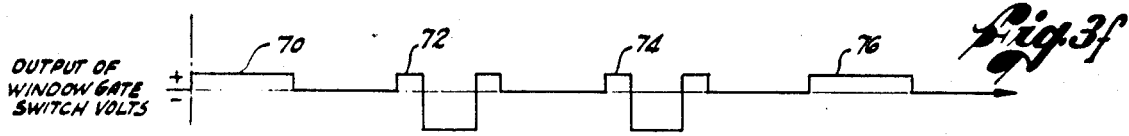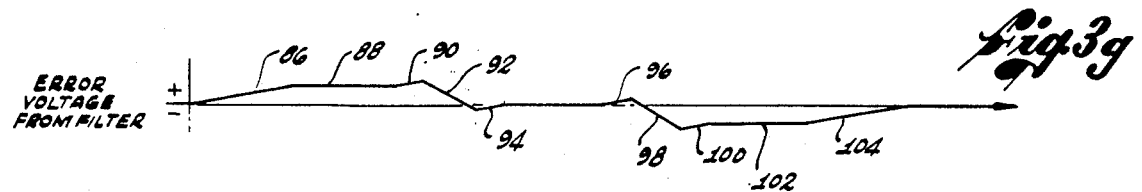

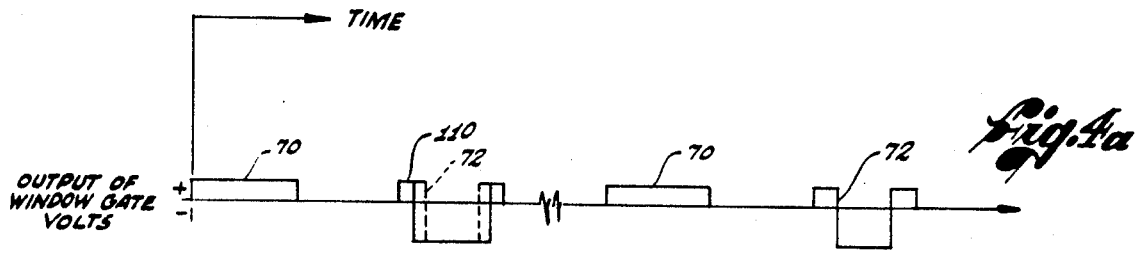
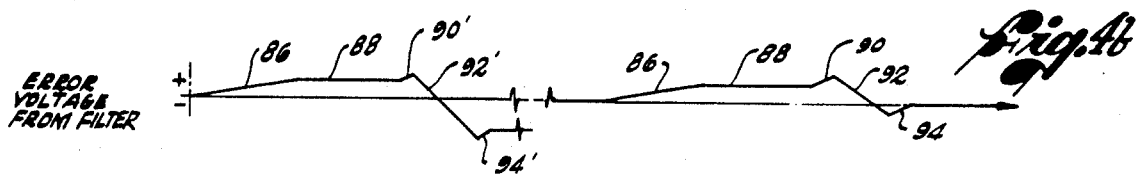
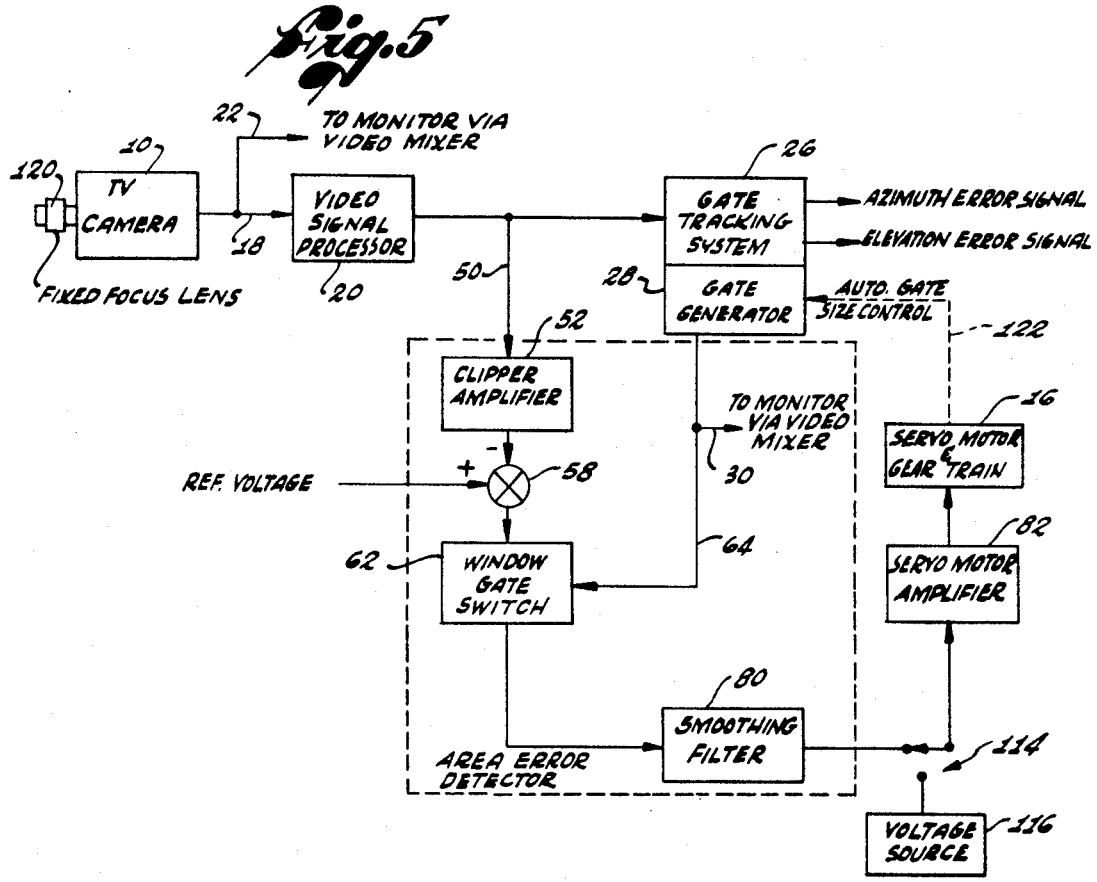

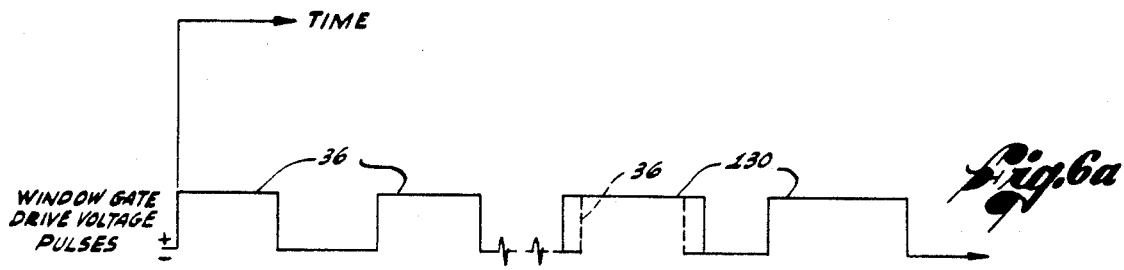
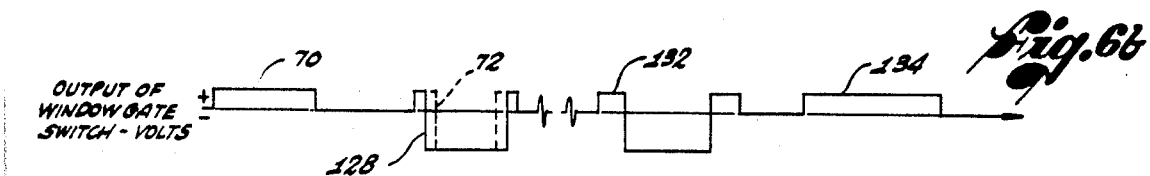
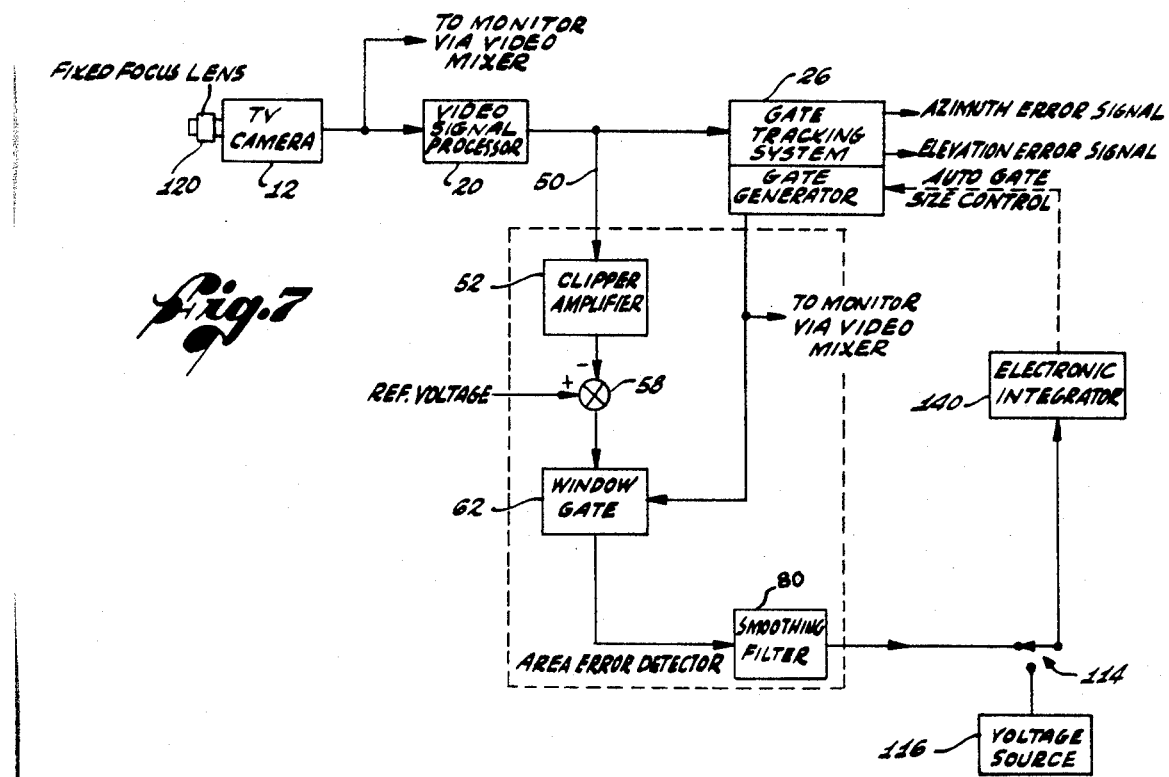

AUTOMATIC CONTROL SYSTEM FOR VIDEO TRACKER

BACKGROUND OF THE INVENTION

1. Field of the Invention

This invention relates to video tracking systems, and more particularly to a novel control system for video trackers to provide automatic tracking of the center of a movable object.

2. Description of Prior Art

In video tracking systems as heretofore known, there is employed a television camera having a fixed focus lens and which is mounted on a movable platform, a monitor receiver, pan and tilt servomechanisms for moving the platform in azimuth and elevation, and a gated video tracker. The video tracker includes electronic circuits for developing signals which operate the receiver and the servomechanisms, all for the purpose of orienting the camera to keep the object centered on the monitor screen.

Typically, gated a video tracker develops horizontal and vertical gating signals to establish a tracking gate "window" on the monitor screen that is of predetermined length and width. The system is adapted to maintain this window in the center of the screen, but is provided with a manual override, popularly called a joy stick, for shifting the window to another portion of the screen. The system includes a window gate generator having a manual gate size control, which the operator can manipulate to adjust the height and width of the window. Such manual control includes a potentiometer, the setting of which determines the magnitude of an applied voltage for gate size control.

When the operator sees an object image on the screen that is to be tracked, he operates the joy stick to cause the window to be moved to a position where it embraces the object image. Then he releases the joy stick, and the tracker circuitry takes over to return the window to the center of the screen, and simultaneously causes the servomechanisms to operate the platform and orient the camera so that the object image remains in the window.

In known video trackers, relative range closure between object and camera is reflected in a wandering aim point for the camera. In this connection, when the object moves toward the camera, the object image in the window grows until it is larger than the window. Since the tracker system works on contrast detail, this condition causes loss of object contour contrast, and the system moves the camera to hunt the internal point of greatest contrast. Thus, the camera aim wanders, and this is reflected in increased system noise and inaccuracies. Often the end result is that the system aims the camera toward some insignificant portion of the object, e.g., the tip of one wing of an aircraft.

SUMMARY OF THE INVENTION

This invention operates a video tracker to maintain a substantially constant ratio between the area of the tracking gate window and the area of the object image therein. As opposed to the prior art, such control of a video tracker keeps the camera aim from wandering and maintains center area tracking of the object, thereby avoiding undesired system noise, inaccuracies, and possible loss of lock-on.

BRIEF DESCRIPTION OF THE DRAWINGS

FIG. 1 is a block diagram of the control system of my invention for a video tracker, which permits the use of a camera with a zoom lens in video trackers, and which varies the focal length of the lens so as to maintain a fixed ratio between the areas of a tracking gate window and an object image on a monitor screen;

FIG. 2 is a plan view of a television monitor screen, showing the tracking gate window and the object image therein;

FIG. 3a–3g, 4a and 4b are graphs of voltage waveforms to aid in explaining the operation of the system of FIG. 1;

FIG. 5 is a block diagram of the system of my invention wherein the video tracker employs a camera with a fixed focus lens, and including means for electromechanically changing the size of the tracking gate window coincidentally with changes in the size of the object image, thereby to maintain a fixed ratio between the areas of the window and the object image;

FIGS. 6a and 6b are additional voltage waveforms to aid in explaining the system of FIG. 5; and FIG. 7 is a block diagram of a system of my invention for a video tracker with a camera having a fixed focus lens, as in FIG. 5, but wherein the size of the gate window is controlled electronically.

DESCRIPTION OF ILLUSTRATIVE EMBODIMENTS

Referring to FIG. 1, there is shown a television camera 10 having a variable focal length zoom lens 12 which is adapted at 14 to be rotated by a servomotor and gear train 16 to vary its focal length. The zoom lens 12 may be a standard lens with a focal length ratio of 10:1.

The camera is coupled as at 18 to the video signal processor 20 of a video tracker, and at 22 to the monitor via a video mixer (not shown). Such video trackers are well known. For example, see the publications, "Automatic Television Tracking System" (1963, by Lear-Siegler, Inc.) and "Automatic TV Tracker Keeps Eye on Missiles" (Apr. 6, 1964 issue of Electronics).

The output of the video signal processor 20 is coupled to the remainder of the tracking system, indicated at 26, for developing azimuth and elevation error signals. The system includes a gate generator 28 which, as indicated at 30, is also coupled to the monitor via the video mixer.

FIG. 3a illustrates the voltage 34 from the processor 20, and FIG. 3e illustrates the voltage pulses 36 in the output of the gate generator 28. The signal voltage 34, of course, has a waveform corresponding to that which is coupled at 22 from the camera 10 to the monitor. In this connection, FIG. 2 illustrates the screen 40 of the monitor, a tracking gate window 42, and an object image 44 (shown as rectangular in this example) to represent an object of rectangular cross-section located within the window 42.

Referring to FIG. 2, there is illustrated a number of horizontal scan lines 46 superimposed on the screen 40. While only eight horizontal lines are illustrated, it will be understood that the example shown is for illustrative purposes only, and that the monitor tube is operated in conventional fashion at a high scan rate, e.g., 525 lines per frame.

In the example shown in FIG. 2, the height of the object image 44 is represented as the space between two adjacent scan lines 46, and the height of the window 42 is shown as the vertical spacing that encompasses four of the lines 46. Referring to FIG. 3e, the widths of the pulses of the voltage pulses 36 determine the width of the window 42, and the number of pulses (four in this instance) determine to the height of the window 42. Similarly, referring to FIG. 3a, the widths of pulses 48 (which occur at the upper and lower edges of the object in the camera scan pattern) determine the widths of corresponding portions of the object image 44, and the number of such pulses (two in this instance) determine the height of the object image.

In this embodiment of my invention, I control the lens 12 so that, despite the constant width and height for the gate window 42, the ratio of the areas of the window 42 and object image 44 remains the same. To this end, and referring to FIG. 1, the processor 20 is connected at 50 to a clipper amplifier network 52. This network, which may be formed of a conventional differential amplifier, develops a smooth square wave 54 (see FIG. 3b) from the signal 34 in the output of the processor 20.

The output of the clipper amplifier 52 is summed at 58 with a d-c reference voltage 60 (see FIG. 3c). The summing device 58 is connected to a window gate switch 62, which is preferably an electronic switch that is adapted to be gated on and off. Such gating is effected by the gate generator 28, which is connected at 64 to the switch 62. Thus, the voltage pulses 36 of FIG. 3e are applied to the switch 62 for effecting its alternate conduction and nonconduction.

FIG. 3d illustrates the voltage 68 that is applied to the switch 62, and is the sum of the signal 54 and the reference voltage 60. Since the switch 62 is made conductive only during the positive pulses of the voltage 36, the output from the switch 62 is constituted of those portions of the voltage 68 that occur coincidentally with the pulses 36. Thus, and referring to FIG. 3f along with FIG. 1, the output of the switch 62 is composed, successively, of a d-c voltage pulse 70, a square wave 72 which is the sum of the positive d-c reference voltage and negative pulse occurring at the upper edge of the object image 44 (FIG. 2), a square wave voltage 74 that is the sum of the d-c reference voltage and the voltage pulse occurring at the lower edge of the object image 44, and a positive voltage pulse 76.

Referring again to FIG. 1, the switch 62 is connected to the input of a smoothing filter 80, which serves as an integrator. The integrated output of the filter 80 is applied to a servomotor amplifier 82 which is connected to the servomotor 16. Accordingly, the servomotor is operated in response to the output of the amplifier 82, and hence the output of the filter 80, to operate the lens 12 and adjust its focal length.

In this latter connection, and referring to FIG. 3g along with FIGS. 1 and 2, the voltage from the filter 80 is a charge voltage 86 that increases during the occurrence of the pulse 70 (FIG. 3f). As indicated at 88, the level reached by the charge voltage 86 is maintained during the interval the switch 62 is cut off. During the next interval when the switch 62 is on, the voltage from the filter 80 increases during the positive portion of the square wave 72, as indicated at 90, decreases at 92 during the negative portion of the square wave, and increases at 94 during the following positive portion of the square wave 72. In the example shown, the error voltage, consisting of the charge voltages 86–94, begins and ends at zero.

During the occurrence of the square wave 74, the charge voltage in the filter 80 increases at 96 during the positive portion of the square wave 74, then decreases at 98 during the negative portion of the square wave, and then increases at 100 during the succeeding positive portion of the square wave. At the end of the square wave 74, the charge voltage 100 is shown as having a negative value, which is maintained at 102 during the interval the switch 62 is cut off. During the next succeeding interval when the switch 62 is on, the charge voltage increases at 104 throughout the positive pulse 76, and terminates at zero.

Thus, the net effect of the error voltage, constituted of charge voltages 86–104, is zero, which means that the net output of the filter 80 is zero. Accordingly, the servomotor 16 is not operated, and the setting of the lens 12 remains the same.

The above-described conditions relate to the situation in which there is no relative movement between the camera and the object being tracked. Where there is relative movement, my control system functions automatically to change the focal length of the lens 12 so that the portion of the window 42 occupied by the object image 44 remains the same. To aid in understanding the operation of my invention in this respect, let it be assumed that the object moves toward the camera and assumes an attitude such that its height remains the same, but its width increases. This assumed condition is illustrated in FIG. 4a, wherein a square wave voltage 110 occurs in which the negative-going portion is substantially wider than that of the square wave voltage 72 of FIG. 3f. The square wave voltage 72 is shown in dotted lines in FIG. 4a.

In this situation, the integrated voltage from the filter 80 during the occurrence of the square wave 110 has charge portions 90', 92', 94' wherein the charge voltage 94' reaches a level other than zero, e.g., a negative voltage in the illustration of FIG. 4b. This results in operation of the servomotor to operate the lens so that its focal length is shortened, thereby to reduce the width of the object image 44 to its original width. Such return to the desired size is illustrated in the right-hand portions of FIGS. 4a and 4b, wherein the square wave 72 again obtains, as do the corresponding charge voltages 86–94.

Although the control system of my invention has been described with reference to a one-dimensional change in the size of the object image 44, it will be apparent that the same type of operation occurs for changes in both height and width of the object image. A change in either or both dimensions results in an error voltage that operates the servomotor, and hence the lens, to retain the desired ratio of gate window area to object image area. In this latter connection, it should be noted that when the height of the object image starts to increase, a greater number of pulses 48 (FIG. 3a) appear in the output of the processor. Thus, assuming such pulses to occur coincidentally with the d-c pulses 70, 76 (FIG. 3f), the resultant error voltage causes the lens 12 to be operated to a wider angle focal length to maintain the image height the same.

The foregoing description proceeds on the assumption that the areas of the window and the object image are of the desired ratio initially. Actually, the initial setting is achieved by independently operating the lens so that the object image is smaller than the window, and then permitting the automatic lens operation described above. In this connection, and referring to FIG. 1, a switch 114 is provided for connecting the amplifier 82 to either the smoothing filter 80 or a voltage source 116. For initial lock-on, the switch 114 is positioned to connect the voltage source 116 to the amplifier. Thereupon the servomotor 16 operates and turns the lens 12 until the object image 44 (FIG. 2) is within the window 42. Then the switch 114 is operated to disconnect the voltage source and to connect the filter 80 to the amplifier 82, after which automatic operation proceeds as previously described.

The above-described embodiment of my invention is one in which the focal length of the lens is variable, and the height and width of the gate window 42 is fixed. The control system of my invention is also equally adapted to controlling a video tracker wherein the camera uses a fixed focus lens and a gate window of variable height and width. Such an arrangement is illustrated in FIG. 5, wherein the camera 10 is shown as having a fixed focus lens 120. As shown, the servomotor 16 is connected at 122 to the gate generator 28.

In this latter connection, reference is made to use of the potentiometer previously mentioned for manual control of the size of the window gate. As has been indicated, the window is usually set at a size selected by the operator by manipulating a manual control knob, i.e., to adjust the position of the wiper of the potentiometer. Thereafter, and until the operator again adjusts the wiper, the window remains fixed in size. Typically, the operator again adjusts the wiper to increase the window size whenever the object image grows — as upon the object approaching the camera — until it is larger than the window. In such case, the operator should adjust the wiper and enlarge the size of the window until it is again larger than the object image. However, such operation of a video tracker requires constant attention of the operator to the monitor display. In addition, upon failure of the operator to adjust the size of the window until after the object image is larger than the window, the aim point of the camera 10 immediately begins to wander.

The control system of my invention effects automatic electromechanical operation of the potentiometer wiper to vary the size of the window. Furthermore, such variation in window size is effected so as to insure that the system maintains the same ratio between window area and object image area.

During initial lock-on, the wiper may be operated manually or electromechanically until the window is larger than the object image. For electromechanical operation, the switch 114 connects the voltage source 116 to the amplifier, thus causing the motor 16 to operate the wiper via the mechanical connection 122, and thereby changing the size of the window until it is large enough to embrace the object image. Then the switch 114 is moved to connect the amplifier 82 to the filter 80. Thereafter, the window size is automatically adjusted as the object image enlarges and reduces in size.

Referring to FIGS. 6a and 6b along with FIGS. 2 and 5, the output of the window gate switch 62 is shown to change at 128 in accordance with an increase in width of the object image 44. This results in an error voltage from the filter 80 which causes the motor 16 to operate the potentiometer wiper to change the operation of the gate generator 28 so as to increase the size of the window 42. In so doing, the window gate drive pulses increase in width as indicated at 130 in FIG. 6a, and the outputs of window gate switch 62, indicated at 132, 134 in FIG. 6b, are of correspondingly greater duration. The width of the negative going portion of the square wave 132 is the same as that at 128. However, the positive portions of such voltage are increased in width, and the ratios of the positive and negative portions of such voltage 132 are substantially the same as for the voltage 72 before the change in object image size.

Such changes in voltage duration occur continuously during relative range closure between the object and the camera. As the object image 44 grows in width and height, so does the window 42. Similarly, if the object image reduces in size, as where the object is moving away, the window decreases in size. At all times, however, the window is of such size that the object image is embraced by it. Accordingly, and as in the arrangement of FIG. 1, the object center is automatically tracked, and the camera aim point does not wander toward different parts of the object.

FIG. 7 illustrates an embodiment of my invention wherein gate pulse size and window size are controlled electronically. For this purpose, the filter 80 is connected to an electronic integrator 140, which in turn is adapted to change the operating voltage for the gate generator 28 in response to the filter output. In this connection, it is only necessary to connect the integrator 140 to the resistance of the aforementioned potentiometer. Once the desired size for the window is achieved, via operation of the switch 114 and voltage source 116 and the integrator 140 is connected to the filter 80, the integrator functions thereafter to adjust the gate generator's operating voltage. Thus, the gate pulses and window size are varied, as in the arrangement of FIG. 5, in accordance with variations in the size of the object image.

The electronic control system above described is also adapted, in accordance with my invention, to effect zoom operation with a camera having a fixed focal length lens. In this connection, the camera in FIG. 7 is provided with an electronic zoom sensor, and may be a standard vidicon, a vidicon with image intensifier, or any suitable sensor tube with which the raster may be electronically controlled to exhibit zoom capability. For such electronic zoom control, the output of the electronic integrator 140 is connected to the raster control circuit of the tube. Accordingly, such embodiment of my invention is one which functions in the manner of the control system of FIG. 1, i.e., to maintain the object image the same size in an unchanging tracking gate window.

While particular embodiments of my invention have been shown and described, it will be apparent that various modifications can be made therein without departing from the spirit and scope of my invention. Therefore, I do not intend that my invention shall be limited, except as by the appended claims.

I claim:

1. In combination:
    means for projecting the images of a movable object and a window onto a screen, the window surrounding the object image and having a desired area relative to the area of the object image;

means coupled to said projecting means for altering the ratio of the areas of said window and object image;

means coupled to said projecting means and being responsive to range movement of the object to automatically detect an error in the desired ratio of the areas of said window and object image; and means coupled between said error detecting means and said altering means and being responsive to said error detecting means to automatically operate and cause said altering means to maintain the desired ratio of the areas of said window and object image.

2. The combination of claim 1, wherein said projecting means includes:
   a television camera;
   a video signal processor coupled to said camera;
   gate tracking means for positioning the window so that it surrounds the object image, said gate tracking means coupled to said processor and having a gate generator;
   a monitor receiver including said screen;
   means for coupling said processor and gate generator to said monitor; and
   wherein said detecting means includes means coupled to said processor and gate generator for developing an error signal corresponding to relative range movement of the object with respect to said television camera, said error signal being applied to said altering means.

3. The combination of claim 2, wherein said camera has a zoom lens; and
   wherein said altering means includes a motor drive for said lens, the error signal being applied to said motor drive.

4. The combination of claim 2, wherein said camera has a fixed focus lens, wherein said gate generator has a movable control element, and wherein said altering means includes a motor drive for said element, the error signal being applied to said motor drive.

5. The combination of claim 2, wherein said camera has a fixed focus lens, wherein said gate generator has a voltage control element, and wherein said altering means includes an electronic integrator connected to said element, the error signal being applied to said integrator.

6. The combination of claim 2, wherein said camera has a fixed focal length lens and an electronically controllable raster circuit, and wherein said altering means includes an electronic integrator connected to said raster circuit, the error signal being applied to said electronic integrator.

7. The combination of claim 2, wherein said detecting means includes:
   a clipper amplifier connected to said processor for converting an input signal therefrom to an output signal;
   a source of reference voltage;
   a summing circuit connected to said clipper amplifier and said source for summing the output signal and reference voltage;
   a switching circuit coupled to said summing circuit and to said gate generator, said switching circuit being gated on and off by said gate generator; and
   an integrating circuit coupled to said switching circuit for supplying the error signal to said altering means in order to maintain the desired ratio of the areas of said window and object image.

8. The combination of claim 7, wherein said camera has a zoom lens, and wherein said altering means includes
   a motor drive mechanically coupled to said lens; and
   a driver amplifier coupled to said motor drive and to said integrating circuit.

9. The combination of claim 8, including an alternate voltage source; and a switch for connecting either said alternate voltage source or said integrating circuit to said driver amplifier.

10. The combination of claim 7, wherein said camera has a fixed focus lens and wherein said gate generator has a movable element for adjusting its operation to control the size of said window, and wherein said altering means includes
    a motor drive mechanically coupled to said movable element; and
    a driver amplifier coupled to said motor drive and to said integrating circuit.

11. The combination of claim 10, including an alternate voltage source; and a switch for connecting either said alternate voltage source or said integrating circuit to said driver amplifier.

12. The combination of claim 7, wherein said camera has a fixed focus lens, wherein said gate generator has a voltage controllable element, and wherein said altering means includes an electronic integrator connected between said voltage controllable element and said integrating circuit for controlling the operating voltage of said gate generator.

13. The combination of claim 11, further including an alternate voltage source, and switch means for connecting either said alternate source or said integrating circuit to said electronic integrator.

14. The combination of claim 7, wherein said camera has a fixed focus lens, wherein said camera has a voltage controllable raster circuit, and wherein said altering means includes an electronic integrator connected to said voltage controllable raster circuit and to said integrating circuit for electronically controlling said camera to effect zoom operation.

* * * * *